United States Patent [19]

Adiletta

[11] Patent Number: 4,564,552
[45] Date of Patent: Jan. 14, 1986

[54] GAS PERMEABLE, WATER AND OIL RESISTANT COMPOSITE STRUCTURE

[75] Inventor: Joseph G. Adiletta, Thompson, Conn.

[73] Assignee: Pall Corporation, Glen Cove, N.Y.

[21] Appl. No.: 658,664

[22] Filed: Oct. 5, 1984

Related U.S. Application Data

[63] Continuation-in-part of Ser. No. 566,404, Dec. 28, 1983, Pat. No. 4,508,775, which is a continuation-in-part of Ser. No. 542,026, Oct. 14, 1983, abandoned.

[51] Int. Cl.$^4$ ............................................. B32B 7/00
[52] U.S. Cl. .................................... 428/246; 428/248; 428/252; 428/284; 428/285; 428/406; 428/903
[58] Field of Search ............... 428/246, 252, 248, 284, 428/285, 406, 903

[56] References Cited

U.S. PATENT DOCUMENTS

| T100,902 | 8/1981 | Hauser ................................ 428/903 |
| 2,803,615 | 8/1957 | Ahlbrecht et al. . |
| 3,016,599 | 1/1962 | Perry, Jr. . |
| 3,489,148 | 1/1970 | Duncan et al. . |
| 3,573,158 | 3/1971 | Pall et al. ............................ 162/156 |
| 3,575,899 | 4/1971 | Pryor et al. . |
| 3,702,279 | 11/1972 | Ardary et al. ....................... 428/903 |
| 3,746,679 | 7/1973 | Seipel, Jr. . |
| 3,788,935 | 1/1974 | Shyne et al. ........................ 428/903 |
| 3,824,126 | 7/1974 | Katsushima et al. . |
| 3,950,588 | 4/1976 | McDougal . |
| 4,058,647 | 11/1977 | Inoue et al. . |
| 4,097,297 | 6/1978 | Keene . |
| 4,135,029 | 1/1979 | Pfeffer . |
| 4,321,404 | 3/1982 | Williams et al. . |
| 4,426,470 | 1/1984 | Wessling et al. ..................... 162/156 |

FOREIGN PATENT DOCUMENTS 53-143716 12/1978 Japan .
55-69677 5/1980 Japan .

OTHER PUBLICATIONS

M. K. Lindemann, "Vinyl Acetate/Ethylene Emulsion Copolymers", *Paint Manufacture, Sep. 1968, pp. 3–36.*

*Primary Examiner*—James J. Bell
*Attorney, Agent, or Firm*—Leydig, Voit & Mayer Ltd.

[57] ABSTRACT

A water and oil resistant, microporous article of footwear comprised of an inner and outer layer of fabric and an intermediate layer comprised of from about 60 to about 40 parts by weight of inorganic reinforcing microfibers, particularly glass, and from about 40 to about 60 parts by weight of a polymeric binding agent, preferably a copolymer of ethylene and vinyl acetate, the polymeric binding agent being in the form of a continuous matrix and derived from an emulsion or latex of particles of the binding agent, in which the particles are less than about 1 micrometer in size. A treating agent, preferably a fluorinated hydrocarbon, is present in the intermediate layer in an amount sufficient to render that layer hydrophobic and oleophobic.

16 Claims, No Drawings

4,564,552

GAS PERMEABLE, WATER AND OIL RESISTANT COMPOSITE STRUCTURE

This application is a continuation-in-part of my co-pending application Ser. No. 566,404, filed Dec. 28, 1983 now U.S. Pat. No. 4,508,775, which is a continuation-in-part of my application Ser. No. 542,026, filed Oct. 14, 1983, which is now abandoned.

TECHNICAL FIELD

This invention relates to gas permeable composite structures and to articles made therefrom suitable for use as protective footwear. More particularly, this invention relates to water and oil resistant, flexible, microporous, inorganic microfiber reinforced structures useful for such applications.

BACKGROUND ART

There are a variety of applications where oil and water resistant, flexible, gas permeable footwear is useful. For example, in the clean up of chemical waste sites, a prevalent problem in our country today, there is a need for protective footwear which (1) will resist the passage of both oil and water-based compositions and (2) is gas permeable, thus allowing passage of air and water vapor and thereby permitting transmission of air and moisture (perspiration) through the footwear from the body side to the atmosphere. In this type of application, detergent and solvent resistant characteristics are also valuable since the nature of the compositions encountered is not always known. Similarly, the need for protective footwear for military personnel who, in the field, may be exposed to deleterious oil and water-based aerosols by virtue of field conditions, provides additional incentive for the development of light-weight, flexible or pliant, microporous (thereby being gas permeable), oil and water resistant structures that can be used in the manufacture of protective fabric and which can be tailored to form socks, shoes, boots and the like.

The subject invention is directed to composite structures which provide the desired properties in such applications.

DISCLOSURE OF THE INVENTION

The subject invention provides a flexible composite structure comprising: (1) an outer layer or layers of fabric secured to one side of (2) an intermediate layer comprising from about 60 to about 40 parts by weight of inorganic reinforcing microfibers, and from about 40 to about 60 parts by weight of a polymeric binding agent in the form of a continuous matrix, said binding agent being derived from an emulsion or latex of particles of said binding agent having a size of less than about 1 micrometer in a liquid, the binding agent and microfibers being present in the intermediate layer in a total amount of 100 parts by weight, based on the weight of the binding agent and the microfibers, with the other side of this intermediate layer secured to (3) an inner layer or layers of fabric.

A hydrophobic, oleophobic treating agent is present in the intermediate layer in an amount sufficient to render that portion of the structure both hydrophobic and oleophobic. The intermediate layer is microporous with pore sizes of about 30 micrometers or smaller, preferably 10 micrometers or smaller, and most preferably on the order of about 2 micrometers, albeit for some applications pore sizes as fine as 0.1 micrometer may be desirable. The overall composite structures of this invention have porosities of from about 0.01 to about 100, preferably from about 0.1 to 20, cubic feet of air per square foot of surface area per minute at a pressure of 0.5 inches WC and a temperature of 20 degrees Centigrade.

BEST MODE FOR CARRYING OUT THE INVENTION

The composite structure of the subject invention is formed of a combination of materials that provide enhanced characteristics when used in the fabrication of protective footwear. It is contemplated that the intermediate layer comprising a binding agent and microfibers may be laminated to an outer protective layer of modern clothlike material such as a heavy cotton duck or highly porous polypropylene fabric, both of which are durable and wear resistant, so that the outer layer protects the integrity of the underlying structure. Alternatively, other fabrics, such as woven nylon, polyester and woven nylon/cotton blends, may be used as the outer protective coating to form a stylish outer facing. In addition, it may be desirable to provide further protection from abrasion by fusing an additional wear resistant material such as a non-woven, spun bonded monofilament polyester to the outside of the reinforced intermediate layer.

It is also desirable to laminate an abrasion resistant material, such as a flexible and pliant polyester knit fabric, to the inside of the intermediate layer. In this way, when the composite structure of the present invention is formed into protective footwear, a smooth and comfortable liner is provided where it will contact the wearer's skin and tend to reduce discomfort caused by chafing.

It has been found that footwear formed from the composite material of this invention will be flexible and conforming, gas permeable (thereby permitting transmission of air and perspiration through the footwear from the body side to the atmosphere), oil and water resistant and solvent resistant and may be used in connection with the clean up of chemical waste sites and other similar applications, or simply for protection from inclement weather.

The intermediate layer of the composite structure of the present invention is comprised of a mixture of inorganic reinforcing microfibers and a polymeric binding agent in the form of a continuous matrix of the binding agent reinforced by the inorganic microfibers, the resulting material being both porous and flexible or pliant. This material has film-like characteristics in that it is a continuous matrix of the binding agent in the form of a thin, porous membrane in which the inorganic microfibers are embedded. This contrasts with conventional inorganic fiber mats in which a binder resin is used to cement the fibers at crossover points. This distinction, coupled with the use of an emulsion or latex containing binder resin particles of less than about 1 micrometer in size, preferably less than about 0.3 micrometer, gives the intermediate layer of this invention its desirable properties.

As used in this invention, the intermediate layer preferably has cloth-like characteristics in that it is not only flexible or pliant, but has draping characteristics similar to that of cloth, i.e., it will hang in loose folds. The reinforcing inorganic microfibers are present in the film-like intermediate layer in an amount in the range of from about 60 to about 40 parts by weight, preferably from about 50 to about 40 parts by weight, and the binding agent is present in an amount of from about 40 to about 60 parts by weight, preferably from about 50 to about 60 parts by weight (the binding agent and the inorganic microfibers being present in the intermediate layer in a total amount of 100 parts by weight based on the weight of the binding agent and the microfibers).

The inorganic microfibers used are in the form of microfibrous fibers. Glass microfibers used in this invention have an average length in the range of from about 50 to about 3,000 micrometers and diameters in the range of from about 0.4 to about 4.0 micrometers, preferably in the range of from about 0.5 to about 2.0 micrometers, more preferably in the range of from about 0.4 to about 1.2 micrometers. The aspect ratios of the glass fibers will generally lie in the range of from about 20:1 to about 1,000:1, preferably being on the order of about 100:1. Glass microfibers of this type are available from Johns Manville Corporation in various grades, e.g., grade 106 is a nominal 0.6 micrometer in diameter size with a 0.54–0.68 micrometer range, grade 104 is a nominal 0.45 micrometer size with a 0.40–0.55 micrometer range, grade 108A is a nominal 0.9 micrometer with a 0.69–1.1 micrometer range and grade 112 is a nominal 3 micrometer size with a 2.6–3.8 micrometer range. Blends of different grades can also be used to provide different distribution sizes than any one grade provides.

Other inorganic microfibers, such as metal, alumina or potassium titanate, may also be used but are less preferred. Mixtures of inorganic microfibers, such as glass and potassium titanate, may also be used. Such mixtures are desirable in applications where a higher liquid resistance is desirable since the potassium titanate fibers are generally finer than the glass fibers. The potassium titanate fibers typically have diameters in the range of from about 0.1 to about 0.5 micrometer with a preferred aspect ratio of about 50:1. Preferably, the lengths of these fibers are in the range of from about 5 to about 25 micrometers. A preferred mixture is about 50 percent by weight glass microfibers and about 50 percent by weight potassium titanate.

The binding agent, to be suitable for use in the intermediate layer of the subject invention, must have the following characteristics. It must (a) hold or bind the microfibers in place, and (b) when combined with the microfibers, form a structure which is porous as well as pliant or flexible. To provide the requisite porosity necessary for the composite structure of the present invention to be gas permeable, providing for transmission of air and water vapor (perspiration) through the structure from the body side to the atmosphere, the binding agent, as mixed with the microfibers to form a slurry or dispersion prior to formation of the fibrous sheet, as described hereinafter, must be in particulate form (preferably in the form of an emulsion or latex), wherein the binder particles are less than about 1 micrometer in size, preferably less than about 0.5 micrometer. The binding agent should, for many applications, be flame resistant as well as stable at temperatures encountered in the field, e.g., temperatures ranging from sub-freezing through ambient conditions and as high as 120 degrees F.

A preferred binder (particularly when fire resistance is desirable) is a heteropolymer formed from vinyl chloride monomer and ethylene, most preferably an ethylene-vinyl chloride acrylamide terpolymer. Materials of this type are available from Air Products and Chemicals, Inc. under the trademark AIR-FLEX ®. Particularly preferred is AIRFLEX ®4500, an ethylene-vinyl chloride terpolymer with amide functionalities in the form of an emulsion. The solids content of this emulsion is at least about 50 weight percent and the average particle size is about 0.12 micrometer.

Other preferred binders, particularly for use in preparing composite structures for footwear such as socks or booties—where a high level of temperature or fire resistance is not critical—are ethylene vinyl acetate emulsion copolymers. These materials are described in some detail in the article in the September 1968 edition of *Paint Manufacture* entitled "Vinyl Acetate/Ethylene Emulsion Copolymers". A preferred copolymer of this type is 100HS/EVA available from Air Products and Chemicals, Inc. It is an ethylene vinyl acetate emulsion copolymer having average particle sizes of less than 1 micrometer and a low curing temperature.

The intermediate layer of this invention is preferably formed by the following general process.

The fibers are mixed with water to form a dispersion or slurry at ambient conditions. (When glass microfibers are used, the pH of the water prior to addition of the microfibers is adjusted to an acidic pH, preferably of about 5, although pH's in the range of from about 3 to about 11 may be used.)

After agitation to form a slurry or dispersion of the fibers, the binding agent, as an emulsion or latex, is added. Retention aids may also be added to enhance resin-fiber bonding. Such retention aids comprise flocculating polyelectrolytes and are available under the tradenames Nalco 634 and 7607. The resulting mixture, having (a) a solids content of from about 0.5 to about 20 weight percent, preferably from about 0.5 to about 10 weight percent, and (b) a viscosity in the range of from about 1 to about 100 centipoise, at ambient conditions, preferably less than about 30, is then mixed for an extended time, preferably for from about 20 to about 60 minutes, to provide a uniform slurry. The slurry is then formed into sheet-like material by casting or spreading the dispersion onto a foraminous structure and removing water. Any suitable apparatus, most appropriately of the type used in paper forming processes, such as a headbox, may be used to cast or spread the dispersion of fibers and polymeric binding agent. After removal of water, typically by draining followed by the application of a vacuum, the formed structure is dried and the binding agent cured. In an alternative embodiment, the intermediate layer of this invention may be formed by casting the slurry directly onto the outer fabric layer. When this is done, the outer layer is preferably surface treated with isopropyl alcohol to ensure a surface free of grease and the like so that a strong integrated structure is obtained.

A preferred method for preparing the intermediate layer of this invention with the preferred microfibers comprises the following steps:

(1) About 1,000 parts of water are placed in a tank and the pH of the water is adjusted to about 5 with an organic or an inorganic acid, e.g., sulfuric or hydrochloric acid.

(2) A blend of (a) glass microfibers having diameters between about 0.1 and 1.2 micrometers and aspect ratios on the order of 100:1 and (b) potassium titanate fibers having diameters of about 0.1 to 0.5 micrometer and aspect ratios on the order of about 50:1, in a weight ratio of glass fibers to potassium titanate fibers of about 4 to 1 are dispersed in the tank of water in an amount such that about 1 part of the inorganic microfibers is present to about 1,000 parts by weight of water. The inorganic microfibers are dispersed in the water with agitation at ambient conditions.

(3) To this dispersion is added the binder agent in the form of a water-based emulsion containing 15 percent by weight of solids of the binder resin. The binder resin emulsion is added in an amount such that the solids content of the emulsion, i.e., the weight of the binding agent, is present in an amount of about 1 part by weight solids to 1 part by weight of the inorganic microfibers present, that is, the ratio of the binder resin solids to the inorganic microfibers is about 1:1. However, the ratio of the binder resin solids to the inorganic microfibers may go as high as 3:2 without departing from the present invention. When the binding agent and microfibers are within the ratios outlined above, the resulting intermediate structure has been found to be particularly strong and durable, and thus particularly suitable for use in protective footwear.

(4) After agitation for an extended time, e.g., circa 40 minutes, to provide uniform dispersion of the components, the dispersion is spread or cast on a foraminous surface and water is removed by free drainage for about 2 seconds followed by the application of a vacuum. The resulting sheet structure is then passed through a dryer at a temperature of from about 220 to 350 degrees F., preferably about 300 degrees F., over about 2 minutes. The resulting flexible, microporous sheet material, in the form of a continuous film-like matrix of the polymer binding agent reinforced by the inorganic microfibers, can then be formed (after treatment to render it hydrophobic and oleophobic) into the composite structure of this invention.

The intermediate layer may be rendered hydrophobic and oleophobic, as well as resistant to solvents and detergents, by a post-treatment with an appropriate treating agent. Alternatively, as discussed below, the treating agent may be combined with the microfibers and binding agent in the slurry prior to laydown and formation of the sheet material. While simplifying the process of manufacture, it has been found that the post-treatment of the intermediate layer with the surface tension modifying treating agent provides a more desirable structure with enhanced properties of oleophobicity, hyrophobicity, detergent resistance and solvent resistance. Accordingly, the post-treatment technique, as described hereinafter, is preferred.

Herein, the following terms have the meanings as set out below:

Hydrophobic: This term refers to the ability to shed water, i.e., the material does not become wetted with water and water does not penetrate the structure of the material. The following test is used to characterize the intermediate layer used in this invention as being hydrophobic: a square of the material, about five inches on a side, is positioned at a 45 degree angle to the horizontal and 5 drops of water from an eye dropper are dropped onto the surface of the material from a height of about six inches. If the water droplets roll off the surface and do not penetrate or wet the structure, that structure is defined as hydrophobic for purposes of this invention.

Oleophobic: This term refers to the ability to shed an oil-based composition, i.e., the material does not become wetted with the oil-based composition nor does it penetrate the structure of the material. The same test as that described above for hydrophobicity, except that 5 drops of mineral oil are substituted for the water drops, is used to characterize the intermediate layer used in this invention as oleophobic. If the mineral oil drops agglomerate but do not wet or penetrate the surface of the structure, the material is defined as oleophobic for purposes of this invention.

Detergent Resistant: This term refers to the ability to shed a detergent-based composition, i.e., the material does not become wetted with the detergent-based composition nor does it penetrate the structure of the material. The same test as that described above for oleophobicity, except that 5 drops of a water-based detergent composition, such as Tween 20, a polyoxyethylene sorbitan monolaurate available from Atlas Powder Company, (at a concentration of 20 weight percent in water) are substituted for the mineral oil drops, is used to characterize the intermediate layer used in this invention as detergent resistant. If the detergent collects but does not wet or penetrate the surface of the structure, the material is defined as detergent resistant for purposes of this invention.

Solvent Resistant: This term refers to the ability to shed a solvent-based composition, i.e., the material does not become wetted with the solvent-based composition nor does it penetrate the structure of the material. The same test as that described above for oleophobicity, except that 5 drops of a 20 percent solution of isopropyl alcohol in water are substituted for the mineral oil drops, is used to characterize the intermediate layer used in this invention as solvent resistant. If the solvent agglomerates and does not wet or penetrate the surface of the structure, the material is defined as solvent resistant for purposes of this invention.

Another test commonly used to determine the resistance of a structure, such as a fabric, to a test material, such as water, oil, a detergent composition or a solvent, is the "stain" test. In this test, a small amount of the test material (e.g., one or two drops) is placed on the structure (while the structure is held in a horizontal position) and the size of the test material (stain) is measured after a specified time, e.g., 30 seconds. The larger the size of the stain, the less resistant the structure is considered to be to the test material. With the intermediate layer of the subject invention, not only do the drops of water, mineral oil, detergent composition or solvent not increase in size over 30 seconds, they are capable of being completely blotted up, e.g., with a paper towel, without leaving a stain. With many other air permeable structures that have been treated in an attempt to render them oleophobic, a stain of mineral oil (or other test material used to determine the structure's oleophobicity) is formed which cannot be completely blotted up.

The treating agent used to render the intermediate layer of this invention oleophobic and hydrophobic as well as preferably to provide detergent and solvent resistance can be any treating agent which imparts the requisite properties as determined by the tests set out above. The preferred fluorochemicals can have varied chemical structures. See for example, U.S. Pat. No. 3,489,148 and the patents cited therein at column 4. Particularly, preferred compositions contain perfluorinated fluorochemicals. These type materials are available from Minnesota Mining and Manufacturing Company under the designations FC-807, FC-809 and FC-824. The actives in FC-807 and FC-809 are described in detail in the Federal Register, Volume 37, Number 96, at pages 9762–9763. Specifically, they are liquid based compositions containing as the active solids a minimum of about 40 percent of ammonium bis(N-ethyl-2-perfluoroalkylsulfonamidoethyl) phosphates, wherein the alkyl group is more than 95 percent $C_8$ and the fluorine content is from 50.1 to 52.8 percent by weight. FC-824 is a perfluoroacrylate copolymer. These treating materials are preferably applied in the form of a dilute mixture comprising, e.g., 7 parts by volume of water, 0.5 parts by volume of diethylene glycol monobutyl ether (available from Union Carbide Corporation under the trademark BUTYL CARBITOL ®) as a fugitive wetting agent and 2.5 parts by volume of the fluorochemical treating agent (which typically will contain 40 percent by weight solids or more). The 2.5 parts by volume referred to above is based on the total volume of the fluorochemical treating agent, e.g., FC-824, as received from the manufacturer. To prepare the dilute treating mixture, the water and n-butyl alcohol should be premixed and the fluorochemical treating agent slowly added to this first mixture with mixing.

After the intermediate layer has been treated, e.g., by spraying or roller coating the dilute treating agent onto the structure, it is then dried, preferably at about 250 to 400 degrees F. for about 30 seconds to 5 minutes.

The film-like intermediate layer of the subject invention will have calipers in the range of from about 3 to about 20 mils, preferably on the order of 5 mils. It will have porosities or permeabilities of from about 0.01 to about 100 cubic feet of air per square foot of surface area per minute at a pressure of 0.5 inches WC and a temperature of 20° C. It will be oleophobic, as defined above, and resist oil-based aerosols to a minimum of 60 inches WC (approximately 2 psi) and will be hydrophobic, as defined above, to resist water immersion and spray to a minimum of 5 psi.

The oleophobic and hydrophobic qualities of the intermediate layer may be enhanced by irridiation from a Gamma radioactive source. It has been found, for example, that when the intermediate layer is exposed to 65 megarads, the oil and water resistant properties were increased by 30% without a corresponding increase in air resistance, i.e. decreased permeability.

The following example illustrates the manner in which the composite structure of the subject invention may be formed. The example is illustrative and the invention should not be considered as limited thereby.

A shell or outerwear woven fabric having a basis weight of about 10 ounces per square yard comprised of woven polypropylene which is surface pretreated with a resin tie-coat, 0.025 inches thick with a burst strength of over 500 psi, was coated with a slurry comprised of glass fibers having diameters in the range of from about 0.4 to about 1.2 micrometers and an equal weight of potassium titanate fibers having diameters in the range of from about 0.2 to about 0.5 micrometer. The slurry contained about 100 parts by weight of an ethylene/vinyl acetate copolymer binding agent solids and 100 parts by weight of the inorganic fibers. The method for preparation of the slurry was substantially as described in the preferred method set out above. After extraction of water, the total solids remaining from the slurry were about 5 grams per square foot or 1.6 ounces per square yard, providing a total basis weight for the coated integral structure of about 11.6 ounces per square yard. The resulting composite material had an air permeability at 0.5 inches WC of 0.26 cubic feet per minute per square foot at 20° C. The pore size averaged about 0.5 micron.

This composite was impregnated with a 4 percent solution of the preferred fluorochemical treating agent described above and then cured to produce the oil and water resistant structure of the subject invention. The integral structure of this example had a hydrostatic resistance to penetration of 5 psi and the intermediate layer was solvent and detergent resistant as measured by the tests set out above.

The composite material was then laminated to a non-woven polypropylene fabric having a basis weight of about 2 ounces per square yard. This fabric formed a smooth and comfortable inner layer when the composite structure of the present invention was formed into protective footwear such as shoes or boots. The resulting composite structure was about 60 mils thick and finds particular application for use by personnel who may be exposed to deleterious oil and water-based aerosols.

An alternate method of forming the composite structure is to lay the intermediate layer comprising a polymer-fiber matrix onto a melt-blown, non-woven polyester having a basis weight of 2 ounces per square yard. This composite is then impregnated with a 4 percent solution of the preferred fluorochemical treating agent and cured. A woven, wear resistant polypropylene or vinyl fabric may then be thermally fused directly to the exposed intermediate layer. A fusible web may be introduced between the intermediate layer and the nonwoven polypropylene to secure a better bond.

I claim:

1. A water and oil resistant, microporous article of footwear comprising:
   (1) an outer layer of fabric;
   (2) an intermediate layer comprising
      (a) from about 60 to about 40 parts by weight of inorganic, reinforcing microfibers,
      (b) from about 40 to about 60 parts by weight of a polymeric binding agent in the form of a continuous matrix, said binding agent being derived from an emulsion or latex of particles of said binding agent having a size of less than one micrometer in a liquid, said binding agent and said microfibers being present in the intermediate layer in a total amount of 100 parts by weight, based on the weight of said binding agent and said microfibers, and
      (c) a treating agent present in an amount sufficient to render the intermediate layer both hydrophobic and oleophobic; and
   (3) an inner layer of fabric.

2. The composite structure of claim 1 having a porosity of about 0.01 to about 100 cubic feet of air per square foot of surface area per minute at a pressure of 0.5 inches WC and a temperature of 20° C.

3. The composite structure of claim 2 wherein said inorganic, reinforcing microfibers comprise glass microfibers.

4. The composite structure of claim 2 wherein said inorganic, reinforcing microfibers comprise a mixture of potassium titanate and glass microfibers.

5. The composite structure of claim 2 wherein said polymeric binding agent is a copolymer of ethylene and vinyl acetate.

6. The composite structure of claim 2 wherein said polymeric binding agent is a copolymer of ethylene and vinyl acetate and wherein said copolymer has chlorinated side chains.

7. The composite structure of claim 2 wherein said polymeric binding agent comprises from about 50 to about 60 parts by weight of said intermediate layer.

8. The composite structure of claim 2 wherein said treating agent comprises a fluorinated hydrocarbon.

9. The composite structure of claim 2 wherein said porosity is in the range of from about 0.1 to about 20.

10. The composite structure of claim 2 wherein said inorganic reinforcing microfibers are glass and have diameters within the range of from about 0.5 to about 2.0 micrometers and aspect ratios of from about 20:1 to about 1,000:1.

11. The composite structure of claim 1 wherein said outer layer of fabric is a polypropylene, a polyester, cotton or rayon.

12. The composite structure of claim 11 wherein said inner layer of fabric is a nonwoven polypropylene.

13. The composite structure of claim 12 wherein said intermediate layer is integral with said inner and outer layers of fabric.

14. The composite structure of claim 1 wherein the polymeric binding agent is fire resistant.

15. The composite structure of claim 1 wherein said inner and outer layers of fabric each comprise multiple layers of fabric.

16. The composite structure of claim 6 wherein the intermediate layer is irradiated by Gamma radiation.

* * * * *